United States Patent [19]

Krstovic

[11] Patent Number: 4,761,103
[45] Date of Patent: Aug. 2, 1988

[54] MICRO-ADJUSTABLE BORING HEAD

[76] Inventor: Dragisa Krstovic, 6307 Westlake Ave., Parma, Ohio 44129

[21] Appl. No.: 44,287

[22] Filed: Apr. 30, 1987

[51] Int. Cl.[4] .............................. B23B 29/03
[52] U.S. Cl. .................... 408/181; 407/45; 407/75; 407/79; 407/88; 408/153
[58] Field of Search ............... 408/152, 153, 147, 169, 408/170, 171, 181; 407/45, 73–79, 88

[56] References Cited

U.S. PATENT DOCUMENTS

| | | | |
|---|---|---|---|
| 3,144,792 | 8/1964 | Marchis | 408/181 |
| 3,518,738 | 7/1970 | Porter | 408/153 X |
| 3,577,810 | 5/1971 | Eckle | 408/162 |
| 4,398,854 | 8/1983 | Pape et al. | 408/153 X |
| 4,516,889 | 5/1985 | Ortlieb | 408/152 |

*Primary Examiner*—Gil Weidenfeld
*Assistant Examiner*—Steven C. Bishop
*Attorney, Agent, or Firm*—Renner, Otto, Boisselle & Sklar

[57] ABSTRACT

A boring head having a diametrical bore adjacent the working end thereof for insertion and removal of two or more interchangeable cutter holders. The cutter holders are restrained against rotational movement within the bore but not axial movement, whereby rotation of a first drive member having threaded engagement with an internally threaded longitudinal bore in the cutter holder will cause radial adjustment of the cutter holder relative to the boring head. Rotation of the first device member is accomplished by rotation of a second drive member having a gear drive connection with the first drive member. A first micrometer dial on the outer end of the first drive member provides for rough orientation of the cutter holder during such radial adjustment thereof, whereas a second micrometer dial on the outer end of the second drive member provides for extremely precise measurements of such radial adjustment.

18 Claims, 2 Drawing Sheets

MICRO-ADJUSTABLE BORING HEAD

BACKGROUND OF THE INVENTION

This invention relates generally, as indicated, to a microadjustable boring head, and, more particularly, to a boring head which is adjustable in very precise increments for accurate machining of the wall of a bore or hole in a workpiece.

It is well known to provide a boring head with one or more adjustable cutters for finish machining the wall of a cylindrical bore in a workpiece. However, there is need to be able to obtain very precise adjustments of the cutter without substantially adding to the cost and complexity of the boring head. Also, there is a need to be able to quickly and easily roughly orient the cutter before making such precise adjustments. Furthermore, there is a need to be able to quickly and easily replace one cutter with another so that different types of cutters can be used with the same boring head, one for making a rough cut and another for making a finish cut.

SUMMARY OF THE INVENTION

With the foregoing in mind, it is a principal object of this invention to provide a boring head of relatively simple construction which provides for extremely precise adjustments of the cutter member carried thereby.

Another object is to provide a simplified mechanism for making such cutter adjustments.

Still another object is to provide such a boring head with two micrometer dials, one to be used during rough orientation of the cutter member and the other to be used for making very precise adjustments of the cutter member.

Yet another object is to provide such a boring head with interchangeable cutter holders to permit replacement of one cutter with another for performing both rough and finish machining operations.

These and other objects may be achieved in accordance with the present invention by providing a boring head with a diametrical bore adjacent the working end thereof for insertion of a cutter holder. The cutter holder is restrained against rotational movement within the bore but not against radial movement, whereby rotation of a drive member having threaded engagement with an internally threaded longitudinal bore in the cutter holder will cause radial inward or outward adjustment of the holder within the diametrical bore.

Rotation of the drive member may be effected by providing a ring gear on the drive member in mating engagement with a worm gear supported by a shaft rotatably mounted in another bore in the boring head extending normal to and adjacent the diametrical bore. The gear ratio and pitch of the threads are such that each increment of rotation of the worm gear shaft will cause very precise adjustments of the cutter member, which adjustments can very precisely be measured by taking readings from a micrometer dial on the outer end of the worm gear shaft. A second micrometer dial on the outer end of the drive member provides for rough orientation of the cutter member.

Further in accordance with the invention, the cutter holder may readily be removed from the boring head and replaced with another cutter holder to permit different types of cutter members to be used with the same boring head for performing both rough and fine machining operations.

To the accomplishment of the foregoing and related ends, the invention, then, comprises the features hereinafter fully described and particularly pointed out in the claims, the following dsscription and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
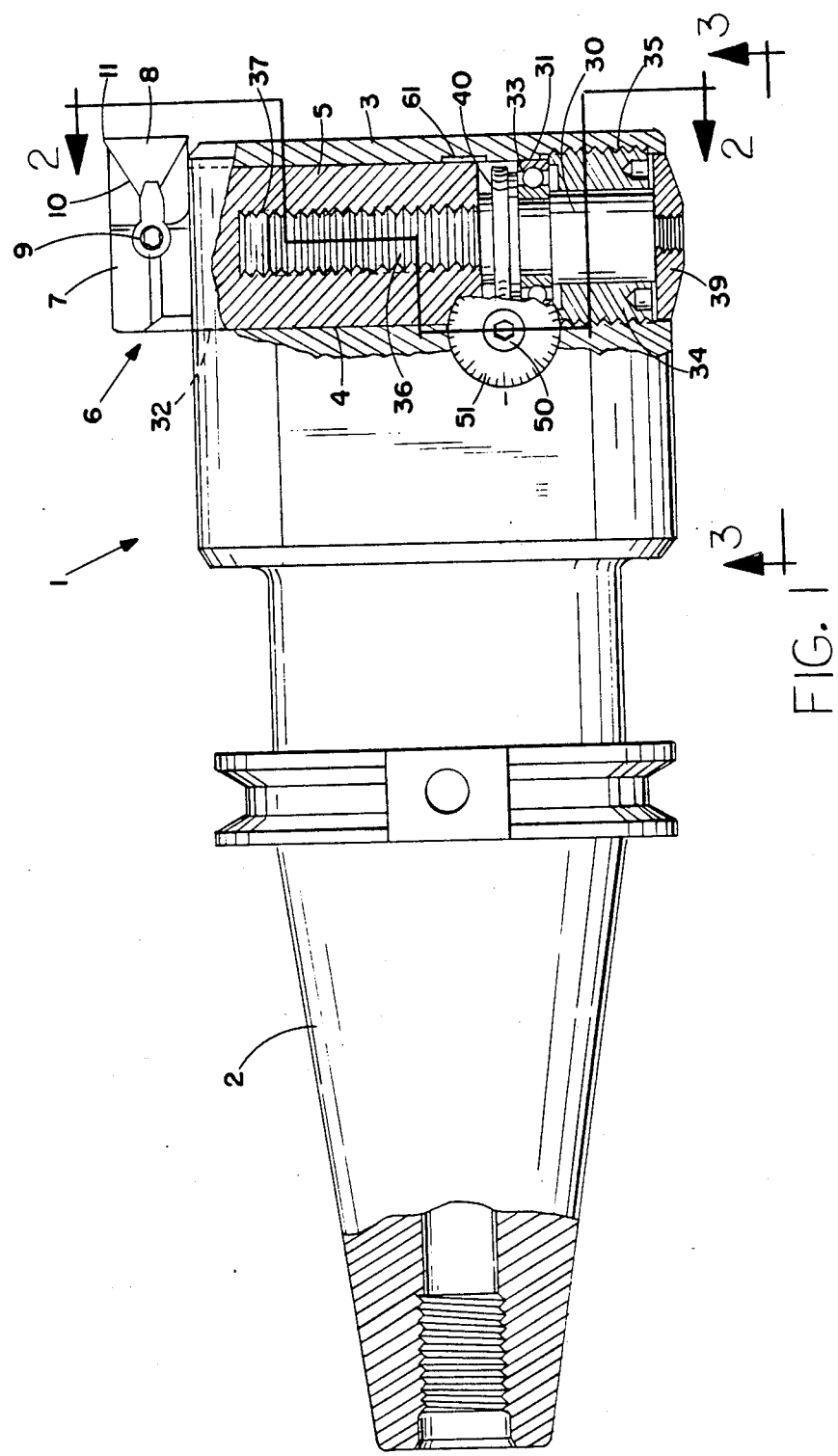
FIG. 1 is a side elevation view, partly in section, of a preferred form of boring head in accordance with this invention.

Referring now in detail to the drawings, and initially to FIG. 1, there is shown a preferred form of boring head 1 in accordance with this invention. At one end of the boring head is a tapered shank 2 which provides for attachment of the boring head to a machine tool of suitable type. As will be apparent, relative rotation will be required between the workpiece (not shown) to be machined and the boring head, but this can be accomplished by rotation of either the boring head or workpiece as desired.

At the other end of the boring head 1 is the working end 3 which has a diametrical bore 4 therethrough for receipt of the cylindrical portion 5 of a cutter holder 6. As clearly shown in FIG. 1, the outer diameter (O.D.) of the cylindrical portion 5 closely matches the diameter of the bore 4 to provide a close sliding fit therebetween for supporting the cutter holder 6 for very precise radial adjustment of the cutter holder relative to the boring head as more fully described hereafter.

When the cutter holder 6 is properly inserted into one end of the diametrical bore 4, the working end 7 of the cutter holder extends radially outwardly beyond the O.D. of the boring head. A slot 10 or the like may be provided in such working end for receipt of a suitable cutting element 8 such as a carbide cutter held in place as by means of a suitable clamp 9 to permit removal of the cutter 8 for turning or replacement as desired. The slot 10 is disposed at the proper angle to provide the necessary rake and clearance angles for the cutting edges or corners 11 which extend slightly forwardly of the cutter holder and boring head as shown.

Figure 4:
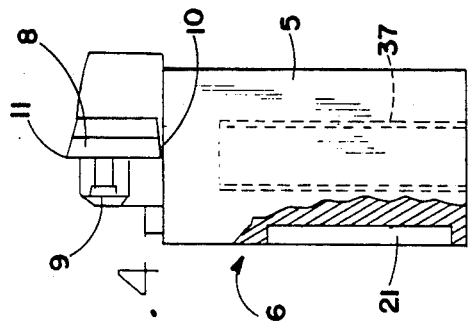
FIGS. 4 and 5 are side elevation views, partly broken away, showing interchangeable cutter holders for use with the boring head shown in FIGS. 1—3.
Figure 5:
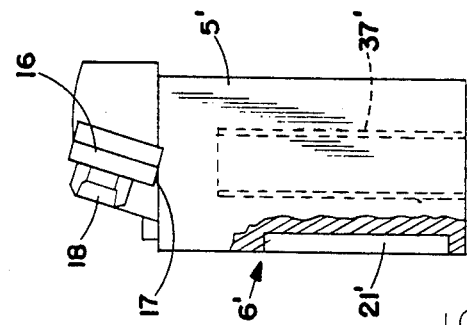
Figure 3:
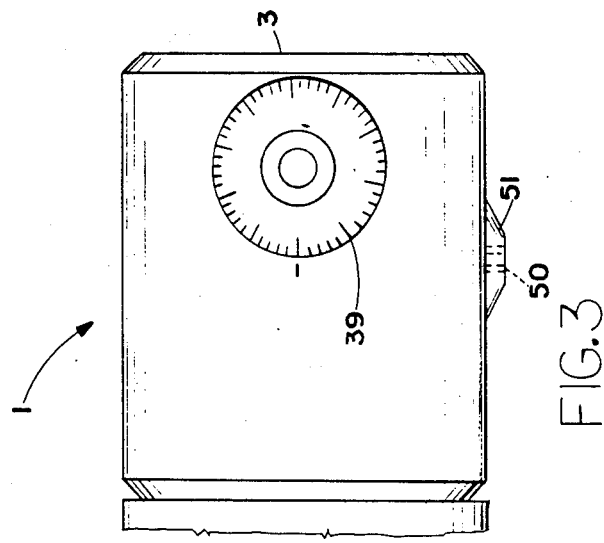
FIG. 3 is a fragmentary side view of the boring head of FIG. 1 as seen from the plane of the line 3—3 thereof.
Figure 2:
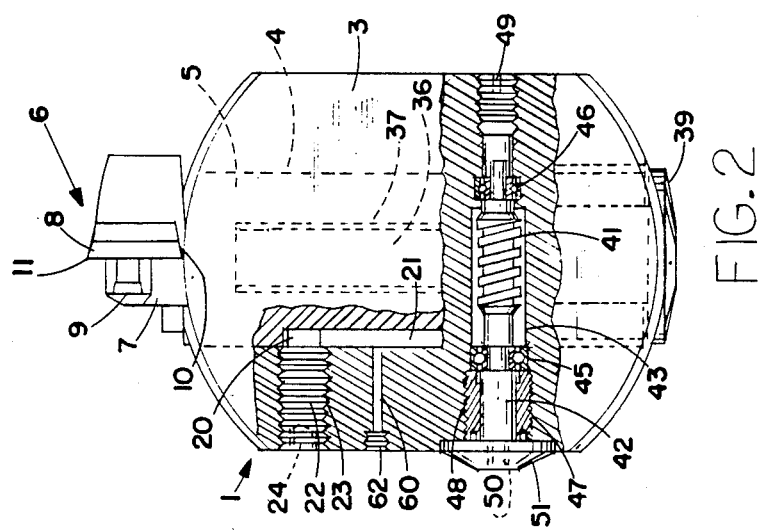
FIG. 2 is a fragmentary transverse section through the boring head of FIG. 1 taken generally along the plane of the line 2—2 thereof.

In accordance with one aspect of the invention, more than one cutter holder 6 or 6' may be interchangeably inserted in the boring head 1 to permit different types of cutter elements 8 or 16 to be used with the boring head by replacing one cutter holder with another. For example, one cutter holder 6 may be provided for mounting of a positive cutter element 8 thereon as shown in FIGS. 1, 2 and 4, and another cutter holder 6' provided for mounting a negative cutter element 16 thereon as shown in FIG. 5. The slot 17 in the negative cutter holder 6' for the negative cutter 16 is disposed at a different angle than the slot 10 in the positive cutter holder 6, as is the clamp 18. Otherwise, the construction of the cutter holder 6' may be substantially the same as the cutter holder 6 previously described, and accordingly, the same reference numerals followed by a prime symbol are used to designate like parts.

Regardless of which cutter holder 6 or 6' is used with the boring head 1, in each case, the cutter holder is restrained against rotation by means of a key 20, shown in FIG. 2, extending into a longitudinal keyway 21 in the O.D. of the cutter holder. The key 20 may be carried by the inner end of a screw member 22 threadedly received in a threaded hole 23 in the boring head extending normal to the holder bore 4, with an Allen wrench socket 24 in the outer end thereof to permit turning of the screw member for moving the key 20 in or out during assembly and disassembly of the cutter holder from the boring head as described hereafter.

Radial adjustment of the cutter holder 6 or 6' relative to the boring head 1 may be accomplished by turning of a shaft 30 rotatably mounted within the end 31 of the holder bore 4 opposite the end 32 from which the cutter holder projects. The shaft 30 is supported by suitable bearings 33 within the holder bore and retained in place as by means of a sleeve bushing 34 threadedly received in a counterbore 35 outwardly of the bearings 33. Shaft 30 has a reduced diameter inner end portion 36 which is externally threadedly for threaded engagement in an internally threaded longitudinal opening 37 in the cutter holder 6 or 6'. Because the cutter holder 6 or 6' is restrained against rotation by the key 20 as aforesaid, rotation of the shaft 30 in opposite directions will cause radial inward or outward adjustment of the cutter holder relative to the boring head at a rate determined by the rate of rotation of the shaft 30 and the pitch of the mating threads on the shaft end portion 36 and cutter holder opening 37.

A micrometer dial 39 is mounted on the outer end of the drive shaft 30 for use in roughly orienting the cutter holder during adjustment thereof. In the preferred form of boring head disclosed herein, there are twenty threads per inch on the mating shaft end portion 36 and boring head opening 37, whereby one complete revolution of the drive shaft 30 will cause 50 mils (0.05 inch) of radial adjustment of the cutter holder. Moreover, the micrometer dial 39 thereon is desirably divided into fifty uniformly spaced increments, whereby each increment of rotation of the drive shaft 30 corresponds to 1 mil (0.001 inch) of radial adjustment of the cutter holder.

Rotation of the drive shaft 30 is precisely controlled and its rotation very precisely measured by providing a ring gear 40 (FIG. 1) on the shaft 30 in mating engagement with a worm gear 41 (FIG. 2) supported by another shaft 42 extending into a bore 43 in the boring head 1 normal to and adjacent the holder bore 4. Spaced apart bearings 45, 46 may be press fitted into the bore 43 for journal mounting of the shaft 42 in such bore. Also, another sleeve bushing 47 may be threadedly received in a counterbore 48 in the outer end of bore 43 for retaining the bearings and shaft within the bore. The bore 43 desirably extends all the way through the boring head 1 to permit a rod or other suitable tool (not shown) to be inserted into such other end to assist in knocking the shaft 42 out of the bore whenever it is desired to disassemble the boring head. Otherwise, a threaded cap 49 is normally threaded into the other end of the bore 43 to close same.

An Allen wrench socket 50 or the like is provided in the outer end of the worm gear shaft 42 to facilitate turning of the worm gear 41. Also, another micrometer dial 51 is provided on such outer end, with suitable markings thereon for precisely measuring the amount of radial adjustment of the cutter holder 6 or 6' resulting from such rotation of the worm gear shaft 42.

In the preferred form of boring head 1 disclosed herein, the gear ratio between the worm gear 41 and ring gear 40 is fifty to one, whereby one complete revolution of the worm gear shaft 42 will cause 2 mils (0.002 inch) of radial adjustment of the cutter holder 6 or 6'. Also, the micrometer dial 51 is desirably divided into forty uniformly spaced increments whereby each increment of rotation of the worm gear shaft 42 will correspond to 0.05 mils (0.00005 inch) of radial adjustment of the cutter holder.

If desired, the keyway 21 may also serve as an oil reservoir for the internal lubrication of parts during use of the boring head 1. Keyway 21 may be filled with oil through an oil hole 60 (FIG. 2) in the boring head in alignment with the keyway 21 but spaced from the threaded bore 23. Also, if desired, the holder bore 4 may be undercut to provide an internal groove 61 (see FIG. 1) which overlaps the inner end of the keyway 21 so that the oil is free to flow around the inner end of the cutter holder 6 or 6'. The outer end of oil hole 60 may be closed by means of a threaded plug 62.

In use, rough orientation of the cutter holder 6 or 6' may be determined by taking readings from the micrometer dial 39 during rotation of the worm gear shaft 42, whereas very precise measurements of the cutter holder 6 or 6' adjustments are obtained by taking readings from the micrometer dial 51.

For rough cutting operations, the cutter holder 6' of FIG. 5, which has a negative cutter element 16 mounted therein, is desirably used, whereas for finish cutting operations, the cutter holder 6 of FIGS. 1, 2 and 4, which has a positive cutter element 8 mounted therein, is desirably used. Replacement of one cutter holder 6 or 6' with another is a simple matter, it only being necessary to back off the set screw 22 sufficiently to disengage the key 20 from the keyway 21 and thereby permit the cutter holder 6 or 6' to be unscrewed from the threaded end portion 36 of drive shaft 30 and the other cutter holder screwed on in its place and the key 20 reset in the keyway 21 or 21' as before.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A boring head comprising a body member having a working end, a diametrical bore extending through said body member adjacent said working end, a cutter holder insertable into one end of said diametrical bore, means providing for limited axial movement of said cutter holder in said diametrical bore while preventing relative turning movement, a first drive shaft rotatably mounted in the other end of said diametrical bore, said first drive shaft having threaded engagement with said cutter holder, whereby rotation of said drive shaft causes axial movement of said cutter holder in said diametrical bore for radially adjusting the position of said cutter holder relative to the axis of said body member, a second drive shaft rotatably mounted in said body member, and gear means between said first and second drive shafts whereby rotation of said second drive shaft will also cause rotation of said first drive shaft, both said first and second drive shafts having wrench engaging sockets in the outer ends thereof to permit the direct turning of said first drive shaft to provide for rough orientation of said cutter holder, and to permit indirect turning of said first drive shaft by turning said second drive shaft for more precise orientation of said cutter holder.

2. The boring head of claim 1 wherein both of said drive shafts have micrometer dials on the outer ends thereof for use in measuring the amount of radial adjustment of said cutter holder caused by the turning of said second drive shaft.

3. The boring head of claim 2 wherein the pitch of the mating threads on said first drive shaft and cutter holder is such that one rotation of said first drive shaft causes a relatively large amount of radial adjustment of said cutter holder.

4. The boring head of claim 3 wherein the gear ratio between said first and second drive shafts is such that one rotation of said second drive shaft causes a relatively small amount of radial adjustment of said cutter holder.

5. The boring head of claim 4 wherein the pitch of said mating threads is such that one complete rotation of said first drive shaft causes approximately 50 mils of radial adjustment of said cutter holder.

6. The boring head of claim 5 wherein said micrometer dial on said first drive shaft is divided into fifty uniformly spaced increments whereby each increment of rotation of said first drive shaft corresponds to approximately 1 mil of radial adjustment of said cutter holder.

7. The boring head of claim 4 wherein the gear ratio between said first and second drive shafts is such that one complete revolution of said second drive shaft causes approximately 2 mils of radial adjustment of said cutter holder.

8. The boring head of claim 7 wherein said micrometer dial on said second drive shaft is divided into forty uniformly spaced increments, whereby each increment of rotation of said second drive shaft corresponds to approximately 0.05 mils of radial adjustment of said cutter holder.

9. The boring head of claim 1 wherein said gear means comprises a ring gear on said first drive shaft and a worm wheel on said second drive shaft in meshing engagement with said ring gear, said first drive shaft being supported by bearing means within said diametrical bore next to said ring gear, said second drive shaft being mounted in a second bore in said body member extending normal to and adjacent said diametrical bore.

10. The boring head of claim 9 wherein both of said drive shafts are bearing mounted in said body member.

11. The boring head of claim 1 wherein said means for permitting limited axial movement of said cutter holder while preventing relative turning movement comprises a key extending into a longitudinal keyway in said cutter holder, said key being carried by a screw member threadedly received in a threaded hole in said body member extending normal to said diametrical bore, said screw member being rotatable in said threaded hole to permit said key to be moved into and out of engagement with said keyway to provide for the removal and/or replacement of said cutter holder.

12. The boring head of claim 11 including a plurality of said cutter holders which are interchangeable with each other.

13. The boring head of claim 12 wherein there are two of said cutter holders, one of said cutter holders having means for mounting a positive cutter element thereon, and the other of said cutter holders having means for mounting a negative cutter element thereon.

14. The boring head of claim 11 wherein said keyway terminates axially inwardly of said one end of said diametrical bore, and an oil hole is provided in said body member in alignment with said keyway to permit oil to be introduced into said keyway which acts as an oil reservoir for the internal lubrication of said boring head, and a removable plug is provided in the outer end of said oil hole.

15. The boring head of claim 14 further comprising internal groove means in said diametrical bore overlapping the inner ends of said keyway and cutter holder to permit oil to flow around the inner end of said cutter holder.

16. A boring head having a diametrical bore adjacent a working end thereof, a cutter holder insertable into one end of said diametrical bore, means for mounting said cutter holder within said diametrical bore for limited axial movement while preventing relative turning movement of said cutter holder in said diametrical bore, a first drive shaft rotatably mounted in the other end of said diametrical bore, said cutter holder having an internally threaded longitudinal opening therein, and said first drive shaft having a threaded end portion in threaded engagement with said internally threaded opening in said cutter holder, whereby rotation of said first drive shaft causes axial movement of said cutter holder in said diametrical bore for radially adjusting the position of said cutter holder relative to the axis of said boring head, a second drive shaft rotatably mounted in said boring head, gear means between said first and second drive shafts whereby rotation of said second drive shaft causes rotation of said first drive shaft, said first and second drive shafts having wrench engaging sockets in the outer ends thereof to permit turning of said first and second drive shafts, a first micrometer dial on the outer end of said first drive shaft to provide for rough orientation of said cutter holder during turning of said first drive shaft by engagement of a wrench in said first drive shaft wrench engaging socket, and a second micrometer dial on the outer end of said second drive shaft for precisely measuring the radial adjustments of said cutter holder during turning of said second drive shaft by engagement of a wrench in said second drive shaft wrench engaging socket.

17. The boring head of claim 16 wherein the pitch of the threaded connection between said first drive shaft and cutter holder is such that one complete revolution of said first drive shaft causes approximately 50 mils of radial adjustment of said cutter holder, and the gear ratio between said first and second drive shafts is such that one complete revolution of said second drive shaft causes approximately 2 mils of radial adjustment of said cutter holder.

18. The boring head of claim 16 wherein said means providing for limited axial movement of said cutter holder while preventing rotation thereof comprises a key extending into a longitudinal keyway in said cutter holder, and means are provided for retracting said key out of engagement with said keyway to permit unscrewing of said cutter holder from said first drive shaft for removal and replacement of said cutter holder with another cutter holder, there being provided two of said cutter holders which are interchangeable with each other, one of said cutter holders having means for mounting a positive cutter element thereon, and the other of said cutter holders having means for mounting a negative cutter element thereon.

* * * * *